(12) United States Patent
Jun (10) Patent No.: US 7,643,069 B2
(45) Date of Patent: Jan. 5, 2010

(54) DEVICE AND METHOD FOR ADJUSTING EXPOSURE OF IMAGE SENSOR

(75) Inventor: Sung Chen Jun, Seoul (KR)

(73) Assignee: Core Logic Inc., Seoul (KR)

( * ) Notice: Subject to any disclaimer, the term of this patent is extended or adjusted under 35 U.S.C. 154(b) by 763 days.

(21) Appl. No.: 11/236,797

(22) Filed: Sep. 28, 2005

(65) Prior Publication Data

US 2006/0203120 A1    Sep. 14, 2006

(30) Foreign Application Priority Data

Mar. 14, 2005    (KR) .................. 10-2005-0021123

(51) Int. Cl.
- *H04N 5/235*    (2006.01)
- *H04N 9/68*    (2006.01)
- *H04N 5/238*    (2006.01)

(52) U.S. Cl. .................. 348/229.1; 348/234; 348/364

(58) Field of Classification Search ................ None
See application file for complete search history.

(56) References Cited

U.S. PATENT DOCUMENTS 6,943,832 B2 *    9/2005    Poplin .................... 348/222.1
7,489,347 B2 *    2/2009    Daiku et al. .............. 348/228.1
2005/0030411 A1 *    2/2005    Aoyagi et al. ............... 348/362

* cited by examiner

*Primary Examiner*—Justin P Misleh
(74) *Attorney, Agent, or Firm*—Foley & Lardner LLP

(57) ABSTRACT

A device for adjusting the exposure of an image sensor includes an average luminance value calculation unit, a first exposure control unit and a correction exposure value calculation unit. The average luminance value calculation unit calculates the first total average luminance value of pixels that are output from the image sensor. The first exposure control unit controls the exposure value of the image sensor based on a previously set exposure value. The correction exposure value calculation unit calculates a correction exposure value by multiplying the exposure value, which is previously set on the first exposure control unit, by the ratio of a target luminance value to the first total average luminance value. Additionally, the first exposure control unit receives the correction exposure value from the correction exposure value calculation unit and controls the exposure value of the image sensor based on the correction exposure value.

8 Claims, 6 Drawing Sheets

DEVICE AND METHOD FOR ADJUSTING EXPOSURE OF IMAGE SENSOR

This Nonprovisional application claims priority under 35 U.S.C. § 119 a on Patent Application No. 10-2005-0021123 filed in Korea on Mar. 14, 2005, the entire contents of which are hereby incorporated by reference.

BACKGROUND OF THE INVENTION

1. Field of the Invention

The present invention relates generally to a device and method for adjusting the exposure of an image sensor and, more particularly, to a device and method for adjusting the exposure of an image sensor capable of performing fast exposure correction for various light sources.

2. Description of the Background Art

An image sensor is a device for photographing images using the light-sensitive characteristic of a semiconductor to detect the varying brightness and wavelengths of light reflected from subjects and to convert the detected brightness and wavelength into electrical values for each pixel. Conversion of the electrical values into levels at which signal processing can be performed is a function of the image sensor. In other words, the image sensor is a semiconductor device for converting an optical image into electrical signals.

A Charge Coupled Device (CCD) or CMOS (Complementary Metal Oxide Semiconductor) image sensor is considered a representative example of an image sensor. A CCD image sensor is a device in which individual MOS capacitors are located closely adjacent to each other. The CCD image sensors transfers an optical image into electrical signals by storing and transmitting charges.

In contrast, a CMOS image sensor is a device that uses the CMOS technique of using a control circuit and a signal processing circuit as peripheral circuits and adopts the switching method of sequentially detecting output by forming and using MOS transistors in proportion to the number of pixels. Such a CMOS image sensor has the advantage of low power consumption, so that it is useful for a personal portable device, such as a mobile phone. Accordingly, the CMOS image sensor can be applied to various applications, such as a Personal Computer (PC) camera, a medical camera, or a toy camera.

In addition, since the characteristics of light sources of an image sensor, such as luminance and color temperature, can vary according to the type of light sources, it is necessary to adjust exposure for the light sources in order to maintain proper luminance for the various light sources having different characteristics. Conventionally, the following two methods have been mainly used to adjust the exposure of an image sensor. A first method is a method of determining an appropriate exposure value for a plurality of frames while increasing or decreasing a currently set exposure value for an image sensor at a low rate. This method facilitates the hardware implementation of an exposure adjustment device for an image sensor, but is problematic in that fast correction is difficult because the exposure value must be corrected for a plurality of frames. In particular, a white screen sustains because a plurality of frames is used at a maximal exposure value (generally, ⅕ sec) when an image sensor moves from a dark place to a bright place, so that fast screen switching is difficult.

A second method is a method of measuring current ambient luminances using an auxiliary device, such as a photodiode (for example, a Light Emitting Diode (LED)), storing an appropriate exposure value list based on the measurement in non-volatile memory (for example, Read-Only Memory (ROM), flash memory, etc.), and then referring to the stored list. This method makes fast correction possible, but has problems in that it requires a separate storage device to store the exposure value list and must acquire the experimental exposure values appropriate for ambient luminance. Furthermore, in the case in which a light source having power frequency characteristics similar to those of a fluorescent lamp is used as the light source of an image sensor, attenuated emission occurs due to an intrinsic afterglow characteristic. As a result, so-called flicker results from variation in color as well as brightness.

SUMMARY OF THE INVENTION

In one aspect of the present invention, a device for adjusting exposure of an image sensor according to an embodiment of the present invention includes an average luminance value calculation unit configured to calculate a first total average luminance value of pixels that are output from the image sensor, a first exposure control unit configured to control the exposure value of the image sensor based on a previously set exposure value, and a correction exposure value calculation unit configured to calculate a correction exposure value by multiplying the exposure value, which is previously set on the first exposure control unit, by the ratio of a target luminance value to the first total average luminance value. The first exposure control unit is further configured to receive the correction exposure value from the correction exposure value calculation unit and to control the exposure value of the image sensor based on the correction exposure value.

Details of Other embodiments are included in the following detailed description and the accompanying drawings.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

The advantages and characteristics of the present invention, and a method of achieving them, will be apparent in reference to embodiments described in detail herein in conjunction with accompanying drawings. However, the present invention is not limited to the embodiments disclosed below, but may be implemented in various ways. Furthermore, the embodiments are provided to complete the disclosure of the present invention, to describe the present invention in detail to the extent the technical concept of the present invention are easily implemented to those skilled in the art, and to fully notify them of the scope of the present invention. The present invention is defined only by the appended claims. Furthermore, the same reference numerals are used throughout the different drawings to designate the same or similar components.

Figure 1:
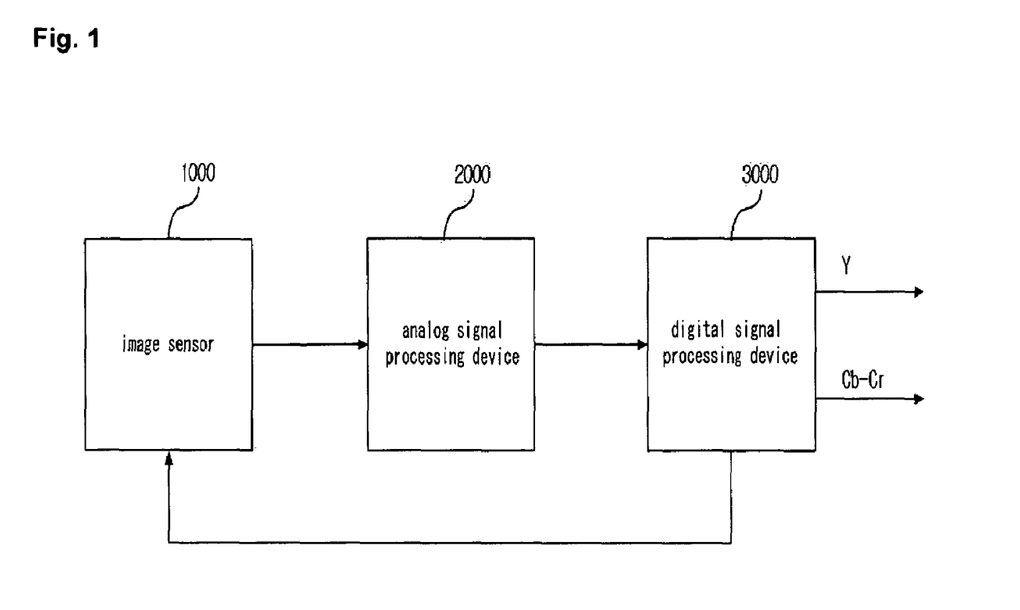
FIG. 1 is a block diagram of an image sensor system consistent with the present invention.

FIG. 1 is a block diagram of the image sensor system consistent with the present invention. As shown in FIG. 1, the image sensor system includes an image sensor 1000, an analog signal processing device 2000, and a digital signal processing device 3000.

The image sensor 1000 preferably includes an optical imaging system, which includes a lens, an iris and an electronic shutter, and a Complementary Metal Oxide Semiconductor (CMOS) imaging device. In the image sensor 1000, when light is incident on the CMOS imaging device from a subject through the optical imaging system, the CMOS imaging device performs photoelectrical conversion to generate an analog image signal.

The CMOS imaging device is prerably formed with a CMOS substrate. A plurality of pixels, each of which includes a photodiode, a transfer gate, a switching transistor, an amplification transistor and a reset transistor, are arranged in a two-dimensional form on the CMOS substrate. A vertical scanning circuit, a horizontal scanning circuit, and an image signal output circuit are also formed on the CMOS substrate. The CMOS imaging device can acquire Red, Green and Blue (RGB) analog image signals or complementary color analog image signals.

The analog image signals from the CMOS imaging device are sampled and held on a color basis, the gains of the analog signals are controlled by an auto gain control, and then the analog image signals are converted into digital image signals in the analog signal processing device 2000. The digital signal processing unit 3000 converts the digital image signals from the analog signal processing device 2000 into a luminance signal Y, a red chrominance signal Cr, and a blue chrominance signal Cb, and outputs them to a display device, such as a Liquid Crystal Display (LCD).

Figure 2:
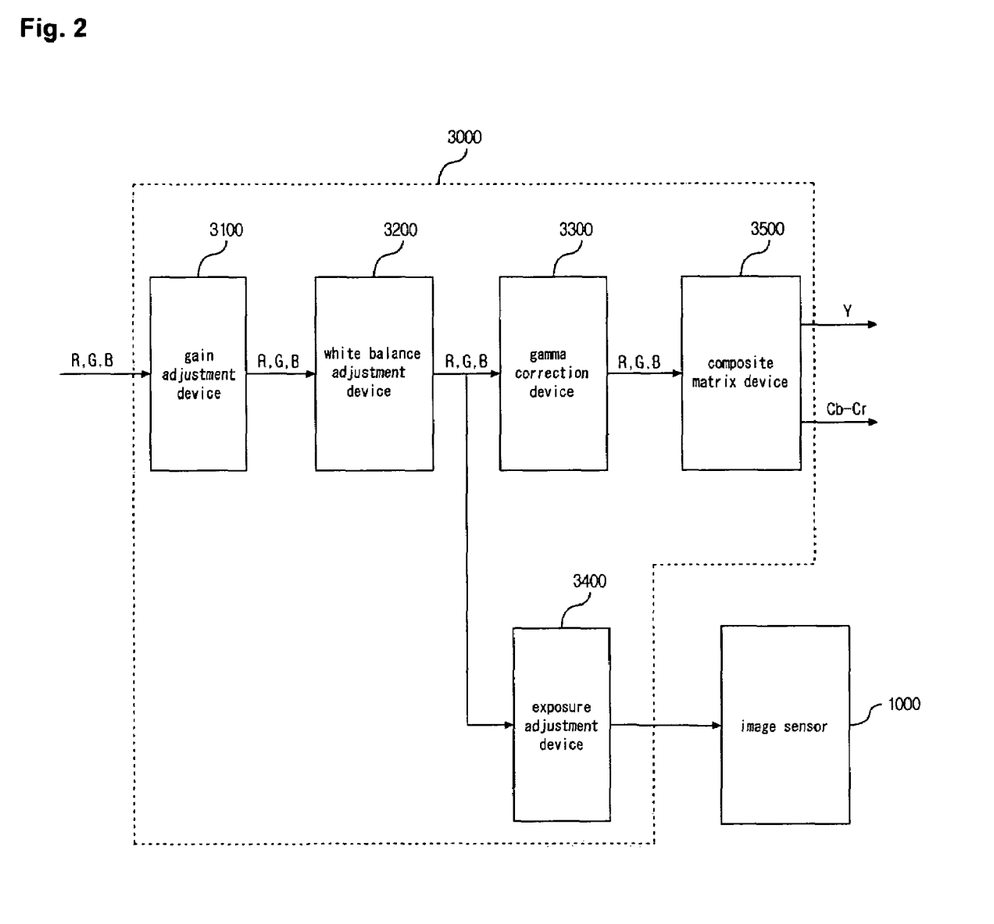
FIG. 2 is a detailed block diagram of the digital signal processing device of FIG. 1.

FIG. 2 is a detailed block diagram of the digital signal processing device of FIG. 1. As shown in FIG. 2, the digital signal processing device 3000 includes a gain adjustment device 3100, a white balance adjustment device 3200, a gamma correction device 3300, an exposure adjustment device 3400, and a composite matrix device 3500.

In the digital signal processing device 3000, the gain adjustment device 3100 adjusts the gains of input RGB color signals, the white balance adjustment device 3200 adjusts the white balances of the RGB color signals, the gamma correction device 3300 corrects the gray scale levels of the RGB color signals, and the composite matrix device 3500 converts the RGB color signals R, G and B into the luminance signal Y, the red chrominance signal Cr, and the blue chrominance signal Cb. Furthermore, the exposure adjustment device 3400 controls the exposure value of the electronic shutter of the image sensor 100 by adjusting the exposure values of the RGB signals R, G and B whose white balances have been adjusted.

Figure 3:
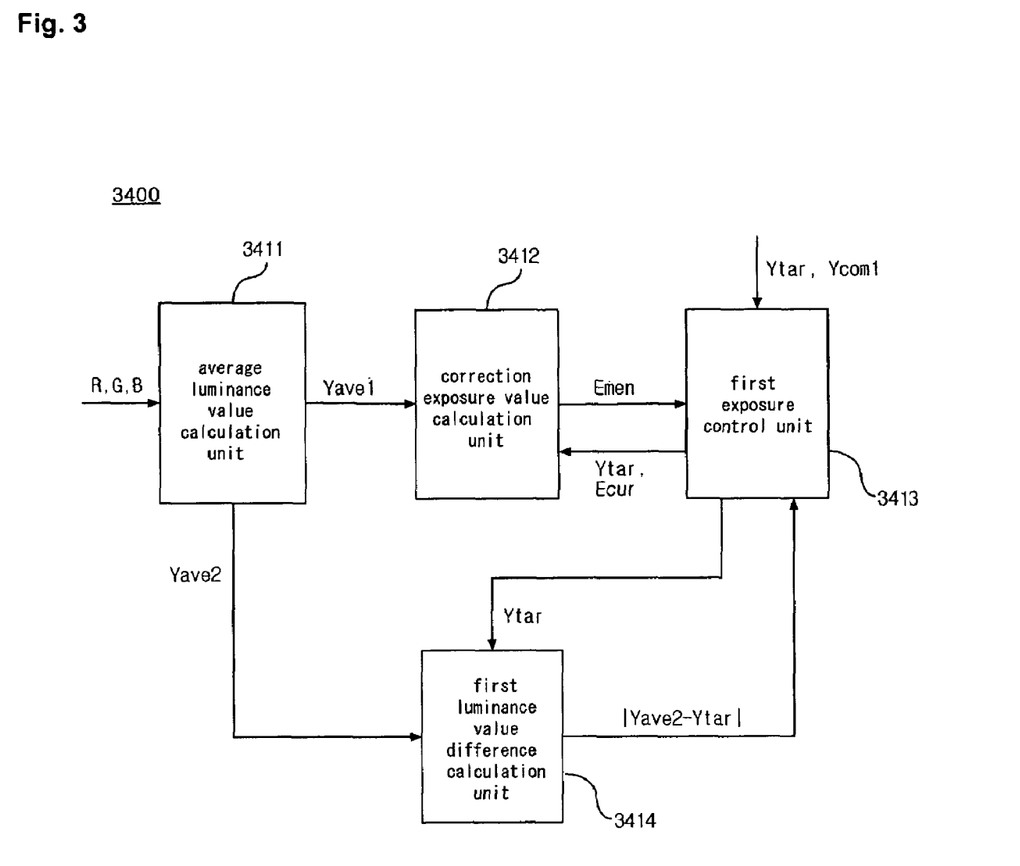
FIG. 3 is a block diagram of a device for adjusting the exposure of an image sensor according to a first embodiment of the present invention.
Figure 4:
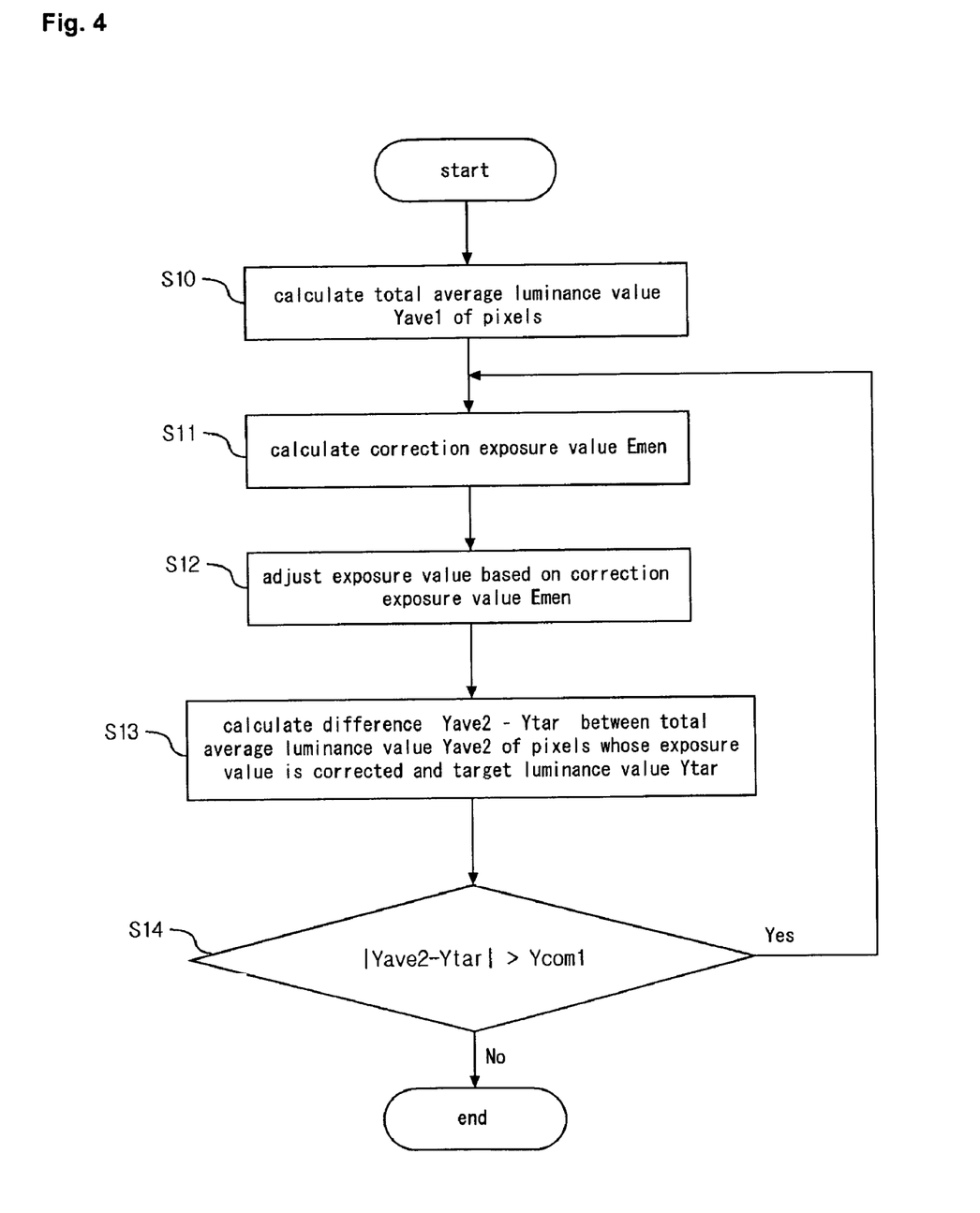
FIG. 4 is a flowchart illustrating a method of adjusting the exposure of an image sensor according to the first embodiment of the present invention.

A device and method for adjusting the exposure of an image sensor according to a first embodiment of the present invention are described below with reference to FIGS. 3 and 4. FIG. 3 is a block diagram of the device for adjusting the exposure of the image sensor according to the first embodiment of the present invention, and FIG. 4 is a flowchart illustrating the method of adjusting the exposure of the image sensor according to the first embodiment of the present invention.

The exposure adjustment unit of the image sensor according to the first embodiment of the present invention includes an average luminance value calculation unit 3411, a correction exposure value calculation unit 3412, a first exposure control unit 3413, and a first luminance value difference calculation unit 3414.

The average luminance value calculation unit 3411 calculates the total average luminance value Yave1 of pixels based on RGB color signals R, G and B input to the digital signal processing unit 3000, the first exposure control unit 3413 controls the exposure value of the electronic shutter of the image sensor 1000 based on a previously set exposure value Ecur, and the correction exposure value calculation unit 3412 calculates a correction exposure value Emen by multiplying the previously set exposure value Ecur by the ratio of the target luminance value Ytar to the total average luminance value Yave1. That is, the correction exposure value Emen is expressed by the following Equation 1:

$$Emen = Ecur * Ytar / Yave1 \qquad (1)$$

where the exposure value may be set to the exposure time of the electronic shutter of the image sensor 1000, the luminance value may be represented using 0 to 255 gray scale levels in the case of 8-bit signals, and the target luminance value Ytar may be variously input according to the light source used or the ambient luminance.

Furthermore, the first luminance value difference calculation unit 3414 receives from the average luminance value calculation unit 3411 the total average luminance value Yave2 of pixels that are output from the image sensor 1000 whose exposure value has been controlled based on the correction exposure value Emen, and calculates the difference |Yave2−Ytar| between the total average luminance value Yave2 and the target luminance value Ytar.

The method of adjusting the exposure of an image sensor according to the first embodiment of the present invention is described below with reference to FIG. 4. The average luminance value calculation unit 3411 calculates the total average luminance value Yave1 of pixels based on the input RGB color signals R, G and B at step S10.

The correction exposure value calculation unit 3412 calculates a correction exposure value Emen by multiplying a previously set exposure value Ecur by the ratio of the target luminance value Ytar to the total average luminance value Yave1 at step S11.

The first exposure control unit 3413 controls the exposure value of the electronic shutter of the image sensor 1000 based on the correction exposure value Emen at step S12. As a result, a separate storage device for storing an exposure value list and the acquisition of experimental exposure values appropriate for ambient luminance can be avoided, and fast exposure correction can be performed for various light sources.

The average luminance value calculation unit 3411 calculates the total average luminance value Yave2 of pixels based on the RGB color signals R, G and B output from the image sensor 1000 after the exposure value of the electronic shutter of the image sensor 1000 has been adjusted, and the first luminance value difference calculation unit 3414 calculates the difference |Yave2−Ytar| between the total average luminance value Yave2 and the target luminance value Ytar at step S13.

The first exposure control unit 3413 compares the difference |Yave2−Ytar| of the luminance values with the first comparison luminance value Ycom1 at step S14. In this case, the first comparison luminance value Ycom1 may be variously input according to the bit number of a luminance value, and the first comparison luminance value Ycom1 may be set to 2 through 5 gray scale levels in the case in which the luminance value is an 8-bit signal.

If the difference |Yave2−Ytar| of the luminance values is greater than the first comparison luminance value Ycom1, the first exposure control unit 3413 performs control so that the step S11 of calculating the correction exposure value Emen, the step S12 of controlling the exposure of the electronic shutter of the image sensor 1000, the step S13 of calculating the difference of |Yave2−Ytar| between the luminance values, and the step S14 of comparing the difference |Yave2−Ytar| of the luminance values with the first comparison luminance value Ycom1 are repeatedly performed until the difference |Yave2−Ytar| of the luminance values becomes smaller than the first comparison luminance value Ycom1.

For example, assuming that the target luminance value Ytar is a 30 gray scale level, the total average luminance value Yave2 is a 40 gray scale level and the first comparison luminance value Ycom1 is a 2 gray scale level when the luminance value is an 8-bit signal, the first exposure control unit 3413 performs control so that the steps S11, S12, S13 and S14 are repeatedly performed until the total average luminance value Yave2 becomes a 28 to 32 gray scale level. Therefore, appropriate exposure values can be effectively acquired for the various light sources.

Figure 5:
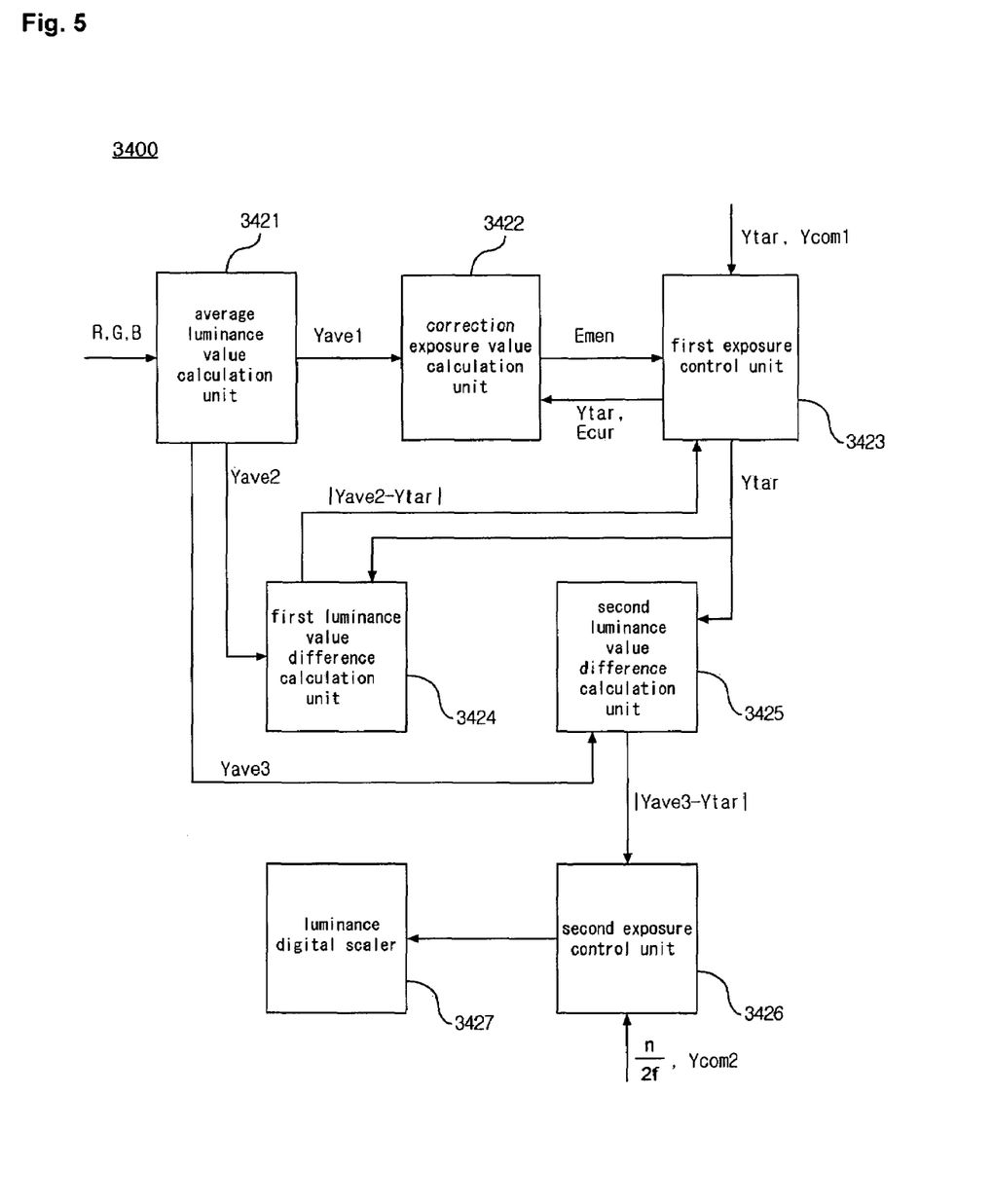
FIG. 5 is a block diagram of a device for adjusting the exposure of an image sensor according to a second embodiment of the present invention.
Figure 6:
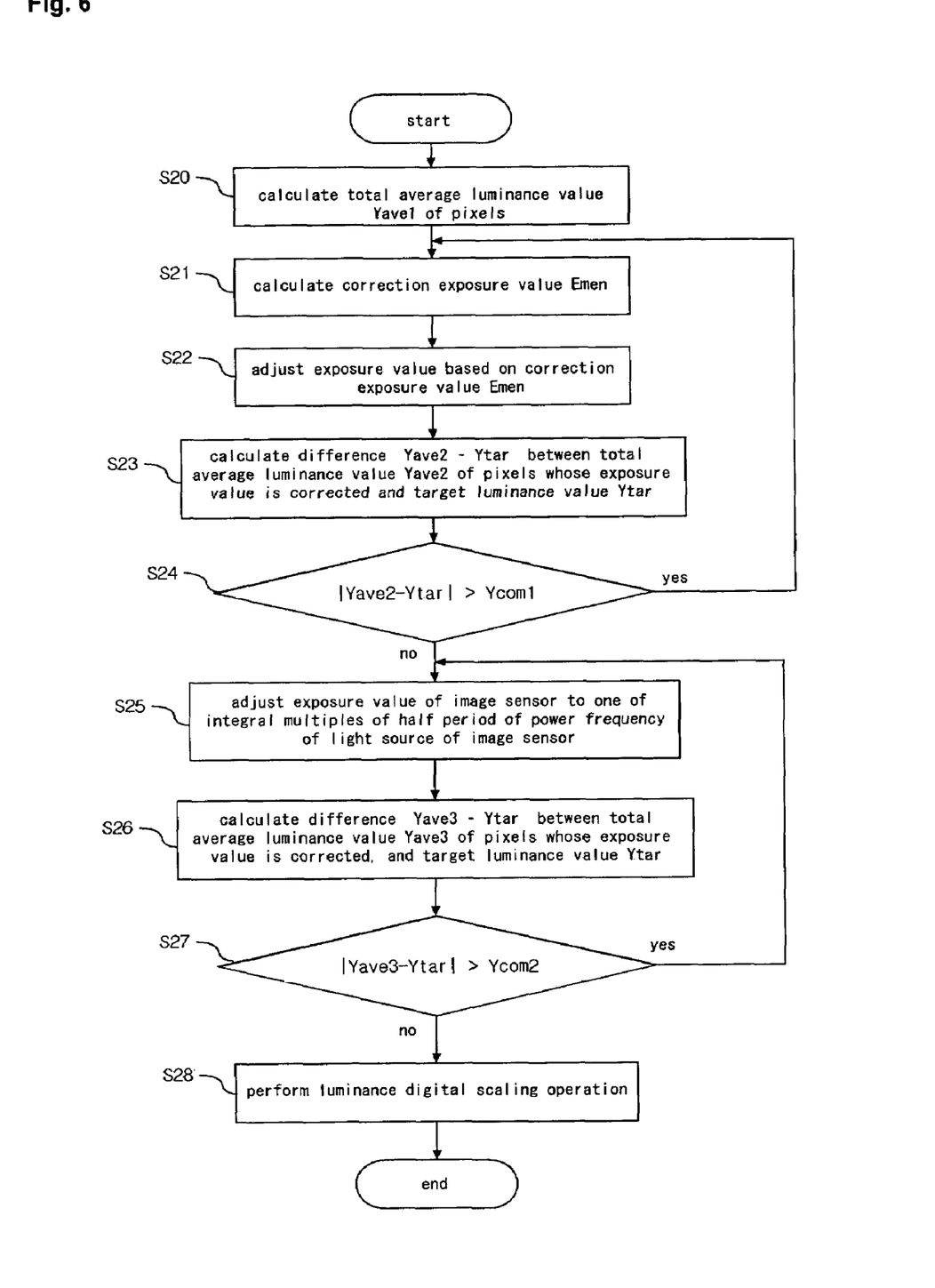
FIG. 6 is a flowchart illustrating a method of adjusting the exposure of an image sensor according to the second embodiment of the present invention.

With reference to FIGS. 5 and 6, a device and method for adjusting the exposure of an image sensor according to a second embodiment of the present invention are described below. FIG. 5 is a block diagram of the device for adjusting the exposure of the image sensor according to the second embodiment of the present invention, and FIG. 6 is a flowchart illustrating the method of adjusting the exposure of the image sensor according to the second embodiment of the present invention.

An average luminance value calculation unit 3421, a correction exposure value calculation unit 3422, a first exposure control unit 3423, and a first luminance value difference calculation unit 3424 of the device for adjusting the exposure of the image sensor according to the second embodiment of the present invention perform the same functions as the average luminance value calculation unit 3411, correction exposure value calculation unit 3412, first exposure control unit 3413, and first luminance value difference calculation unit 3414 of the device for adjusting the exposure of the image sensor according to the first embodiment of the present invention. However, the device for adjusting the exposure of the image sensor according to the second embodiment of the present invention further includes a second luminance value difference calculation unit 3425, a second exposure control unit 3426, and a luminance digital scaler 3427, compared to the device for adjusting the exposure of the image sensor according to the first embodiment of the present invention.

The second exposure control unit 3426 performs control so that the exposure value of the image sensor 1000 becomes one of integral multiples n/2f of the half period of the power frequency of the light source of the image sensor 1000. The second luminance value difference calculation unit 3425 receives from the average luminance value calculation unit 3421 the total average luminance value Yave3 of pixels based on RGB color signals R, G and B that are output from the image sensor 1000 whose exposure value has been adjusted to one of the integral multiple numbers n/2f of the half period of the power frequency of the light source, and calculates the difference |Yave3−Ytar| between the total average luminance Yave3 and the target luminance value.

Furthermore, the luminance digital scaler 3427 performs a digital scaling operation so that the difference |Yave3−Ytar| of the luminance values becomes smaller than the first comparison luminance value Ycom1.

The steps S20, S21, S22, S23 and S24 of the method of adjusting the exposure of the image sensor according to the second embodiment of the present invention perform the same functions as the steps S10, S11, S12, S13 and S14 of the method of adjusting the exposure of the image sensor according to the first embodiment of the present invention.

The method of adjusting the exposure of the image sensor according to the second embodiment of the present invention is described below with reference to FIG. 6. After comparing the difference |Yave2−Ytar| of the luminance values with the first comparison value Ycom1 at step S24, the second exposure control unit 3426 performs control so that the exposure value of the electronic shutter of the image sensor 1000 becomes one of integral multiples n/2f of the half period of the power frequency of the light source of the image sensor 1000 at step S25. One of the integral multiples n/2f of the half period of the power frequency f of the light source may be input depending on the power frequency f of the light source. For example, when the power frequency f of the light source is 60 Hz, one of the integral multiples of the half period of the power frequency f of the light source, that is, 1/120 sec, 2/120 sec, 3/120 sec or the like, may be input.

The average luminance value calculation unit 3421 calculates the total average luminance value Yave3 based on RGB color signals R, G and B that are output from the image sensor 1000 whose exposure value has been adjusted to one of the integral multiples n/2f of the half period of the power frequency of the light source. The second luminance difference calculation unit 3425 calculates the difference |Yave3−Ytar| between the total average luminance Yave3 and the target luminance value Ytar at step S26.

The second exposure control unit 3426 compares the difference |Yave3−Ytar| between the luminance values with the second comparison luminance value Ycom2 at step S27. In this case, it is preferable that the second comparison luminance value Ycom2 be set to be greater than the first comparison luminance value Ycom1. Furthermore, the second comparison luminance value Ycom2 may be variously input depending on the number of bits of the luminance value. For example, when the luminance value is represented using an 8-bit signal, the second comparison luminance value may be set to 8 through 12 gray scale levels.

When the difference |Yave3−Ytar| between the luminance values is greater than the second comparison luminance value Ycom2, the second exposure control unit 3426 performs control so that the step S25 of controlling the electronic shutter of the image sensor 1000, the step S26 of calculating the difference of |Yave3−Ytar| of the luminance values, and the step S27 of comparing the difference |Yave3−Ytar| of the luminance values and the second comparison luminance value Ycom2 are repeatedly performed until the difference |Yave3−Ytar| between the luminance values becomes smaller than the second comparison luminance value Ycom2.

For example, assuming that the target luminance value Ytar is a 30 gray scale level, the total average luminance value Yave2 is a 60 gray scale level, the second comparison luminance value Ycom2 is a 10 gray scale level, and the power frequency f of the light source is 60 Hz when the luminance value is an 8-bit signal, the second exposure control unit 3426 performs control so that the steps S25, S26 and S27 are repeatedly performed while sequentially increasing the power frequency f of the light source in order of 1/120 sec, 2/120 sec and 3/120, until the total average luminance value Yave3 becomes a 20 to 40 gray scale level. Therefore, since variation in brightness or color according to the characteristics of the power frequency can be prevented, flicker can be effectively suppressed even when using a fluorescent lamp having power frequency characteristics, as a light source.

The second exposure control unit 3426 performs control so that the luminance digital scaler 3427 performs a luminance digital scaling operation until the difference |Yave3−Ytar| between the total average luminance value Yave3 and the target luminance value Ytar becomes smaller than the first comparison luminance value Ycom1 at step S28.

For example, assuming that the total average luminance value Yave3 of pixels is a 40 gray scale level based on the RGB color signals R, G, and B that are output from the image sensor 1000 after the exposure value has been adjusted to one of the integral multiples n/2f of the half period of the power frequency of the light source, the target luminance value Ytar is a 30 gray scale level, and the first comparison luminance value Ycom1 is a 2 gray scale level in the case in which the luminance value is an 8-bit signal, the second exposure control unit 3426 performs control so that the luminance digital scaler 3427 performs the luminance digital scaling operation until the total average luminance value Yave3 becomes a 28 to 32 gray scale level. Therefore, flicker can be effectively suppressed even when using a fluorescent lamp having power frequency characteristics as a light source and, at the same time, appropriate exposure values are effectively acquired for the various light sources.

Now, although the embodiments of the present invention have been described with reference to accompanying drawings, those skilled in the art can appreciate that the present invention may be implemented in some other concrete forms without departing from the scope and concept thereof. Accordingly, it must be appreciated that the embodiments described above are illustrative but not restrictive.

As described above, the device and method according to the first embodiment of the present invention makes it possible to adjust the exposure of the image sensor without a separate storage device for storing an exposure value list and without the acquisition of experimental exposure values appropriate for ambient luminance. It is also possible to perform fast exposure correction for various light sources.

Furthermore, the device and method for adjusting the exposure of the image sensor according to the first embodiment of the present invention also makes it possible to effectively suppress flicker even when using a fluorescent lamp having power frequency characteristics as a light source and, at the same time, effectively acquire appropriate exposure values for the various light sources.

What is claimed is:

1. A device for adjusting exposure of an image sensor, comprising:
   an average luminance value calculation unit configured to calculate a first total average luminance value of pixels that are output from the image sensor;
   a first exposure control unit configured to control an exposure value of the image sensor based on a previously set exposure value;
   a correction exposure value calculation unit configured to calculate a correction exposure value by multiplying the previously set exposure value by a ratio of a target luminance value to the first total average luminance value; and
   a first luminance value difference calculation unit configured to receive from the average luminance value calculation unit a second total average luminance value of pixels that are output from the image sensor whose exposure value is controlled based on the correction exposure value and to calculate a difference between the second total average luminance value and the target luminance value;
   wherein the first exposure control unit is further configured to receive the correction exposure value from the correction exposure value calculation unit and to control the exposure value of the image sensor based on the correction exposure value, and
   wherein the first exposure control unit is further configured to compare the first difference with a first comparison luminance value and to control the exposure value of the image sensor so that the first difference becomes smaller than the first comparison luminance value.

2. The device as set forth in claim 1, further comprising:
   a second exposure control unit configured to perform control so that the exposure value of the image sensor becomes one of integral multiples of a half period of a power frequency of a light source of the image sensor; and
   a second luminance value difference calculation unit configured to receive from the average luminance value calculation unit a third total average luminance value of pixels that are output from the image sensor whose exposure value has been adjusted to one of the integral multiples of the half period of the power frequency of the light source and to calculate a second difference between the third total average luminance value and the target luminance value;
   wherein the second exposure control unit is further configured to compare the second difference with a second comparison luminance value and to control the exposure value of the image sensor so that the second difference becomes smaller than the second comparison luminance value.

3. The device as set forth in claim 2, further comprising:
   a luminance digital scaler configured to perform a luminance digital scaling operation so that the second difference between the third total average luminance value and the target luminance value becomes smaller than the first comparison luminance value.

4. A method for adjusting the exposure of an image sensor, comprising the steps of:
   calculating a first total average luminance value of pixels output from the image sensor;
   calculating a correction exposure value by multiplying a previously set exposure value by a ratio of a target luminance value to the first total average luminance value;
   controlling an exposure value of the image sensor based on the correction exposure value;
   calculating a first difference between a second total average luminance value of pixels that are output from the image sensor whose exposure value is controlled based on the correction exposure value and the target luminance value; and
   comparing the first difference with a first comparison luminance value,
   wherein, if the first difference is greater than the first comparison value after comparing the first difference and the first comparison luminance value, the steps of calculating the correction exposure value, controlling the exposure value of the image sensor, calculating the first difference, and comparing the first difference with the first comparison luminance value are repeatedly performed until the first difference becomes smaller than the first comparison value.

5. The method as set forth in claim 4, further comprising the steps of:
performing control so that the exposure value of the image sensor becomes one of integral multiples of a half period of a power frequency of a light source of the image sensor;
calculating a second difference between a third total average luminance value of pixels which are output from the image sensor whose exposure value has been adjusted to one of the integral multiples of the half period of the power frequency of the light source and the target luminance value; and
comparing the second difference with a second comparison luminance value.

6. The method as set forth in claim 5, wherein, if the second difference is greater than the first comparison value after comparing the second difference with the second comparison luminance value, the steps of controlling the exposure value of the image sensor, calculating the second difference, and comparing the second difference with the second comparison luminance value are repeatedly performed until the second difference becomes smaller than the second comparison value.

7. The method as set forth in claim 6, further comprising the step of:
performing a luminance digital scaling operation so that the second difference between the third total average luminance value and the target luminance value becomes smaller than the first comparison luminance value.

8. The method as set forth in claim 5, further comprising the step of:
performing a luminance digital scaling operation so that the second difference between the third total average luminance value and the target luminance value becomes smaller than the first comparison luminance value.

* * * * *